(12) United States Patent
Leavitt

(10) Patent No.: US 9,125,349 B2
(45) Date of Patent: Sep. 8, 2015

(54) SELF-WATERING, MOBILE, CONTAINER GARDENING SYSTEM

(71) Applicant: Joseph K. Leavitt, Gainesville, FL (US)

(72) Inventor: Joseph K. Leavitt, Gainesville, FL (US)

( * ) Notice: Subject to any disclaimer, the term of this patent is extended or adjusted under 35 U.S.C. 154(b) by 0 days.

(21) Appl. No.: 14/135,942

(22) Filed: Dec. 20, 2013

(65) Prior Publication Data

US 2015/0173303 A1 Jun. 25, 2015

(51) Int. Cl.
*A01G 9/02* (2006.01)
(52) U.S. Cl.
CPC .......................................... *A01G 9/02* (2013.01)
(58) Field of Classification Search
CPC ....................................................... A01G 9/02
USPC .............. 47/66.1, 66.3, 66.7, 79, 82; 119/221
See application file for complete search history.

(56) References Cited

U.S. PATENT DOCUMENTS

| | | | |
|---|---|---|---|
| 3,675,626 A * | 7/1972 | Down ............................ | 119/238 |
| 4,204,500 A * | 5/1980 | Podjan ......................... | 119/57.8 |
| 4,211,034 A | 7/1980 | Piesner | |
| 4,379,375 A | 4/1983 | Eisenberg et al. | |
| 4,476,651 A | 10/1984 | Drury | |
| 4,630,394 A | 12/1986 | Sherard | |
| 4,669,217 A | 6/1987 | Fraze | |
| 4,926,585 A | 5/1990 | Dreschel | |
| 5,010,686 A | 4/1991 | Rivest | |
| 5,067,275 A | 11/1991 | Constance | |
| 5,161,327 A | 11/1992 | Campbell et al. | |
| 5,276,997 A | 1/1994 | Swearengin et al. | |
| 5,381,625 A | 1/1995 | Wente | |
| 5,394,647 A | 3/1995 | Blackford, Jr. | |
| 5,428,922 A | 7/1995 | Johnson | |
| 5,918,416 A | 7/1999 | Ammann, Jr. | |
| 6,219,966 B1 | 4/2001 | Lapointe et al. | |
| 6,247,268 B1 | 6/2001 | Auer | |
| 6,574,917 B2 | 6/2003 | Boxsell | |
| 6,615,542 B2 | 9/2003 | Ware | |
| 6,840,008 B1 | 1/2005 | Bullock et al. | |
| 6,978,735 B1 * | 12/2005 | Yeager .......................... | 119/221 |
| 7,168,206 B2 | 1/2007 | Agius | |
| 7,877,927 B2 | 2/2011 | Roy et al. | |
| 8,065,833 B2 | 11/2011 | Triantos | |
| 8,122,643 B2 | 2/2012 | Harder | |
| 8,166,704 B1 | 5/2012 | Sydlowski | |
| 8,250,809 B2 | 8/2012 | Simmons | |
| 8,261,487 B2 | 9/2012 | Harder | |
| 8,291,641 B2 | 10/2012 | Triantos | |
| 8,327,582 B2 | 12/2012 | Storey | |

(Continued)

FOREIGN PATENT DOCUMENTS

WO WO 2013-089818 6/2013

*Primary Examiner* — Rob Swiatek
*Assistant Examiner* — Ebony Evans
(74) *Attorney, Agent, or Firm* — Saliwanchik, Lloyd & Eisenschenk

(57) ABSTRACT

A self-contained container gardening system that utilizes a continuous tubular structure raised on stringer supports that provide a spiral configuration. Ports within the tubular sections allow for planting along the length of the tubular structure. A porous hose within the system provides water and other nutrients, while port covers inhibit rain, insects, pests, disease, and other undesirables from gaining access to the soil and plant roots. A reservoir tank attached to the system allows water to be stored and released as needed and gravity-fed into the porous hose. The entire system can be wheeled to any desired location without concern for water or electrical access. A protective cover supported by one or more uprights can provide additional protection to plants.

23 Claims, 8 Drawing Sheets

(56) References Cited

U.S. PATENT DOCUMENTS

| | | |
|---|---|---|
| 8,418,403 B1 | 4/2013 | Nuttman |
| 8,505,238 B2 | 8/2013 | Luebbers et al. |
| 2001/0034974 A1 | 11/2001 | Cameron et al. |
| 2004/0103583 A1 | 6/2004 | Eriksen et al. |
| 2006/0150496 A1 | 7/2006 | Blaakmeer et al. |
| 2006/0218860 A1 | 10/2006 | DeFrancesco |
| 2010/0146854 A1 | 6/2010 | Cannon et al. |
| 2011/0067301 A1 | 3/2011 | DeMitchell et al. |
| 2011/0271590 A1 | 11/2011 | Poolar |
| 2011/0296757 A1 | 12/2011 | McGrath |

* cited by examiner

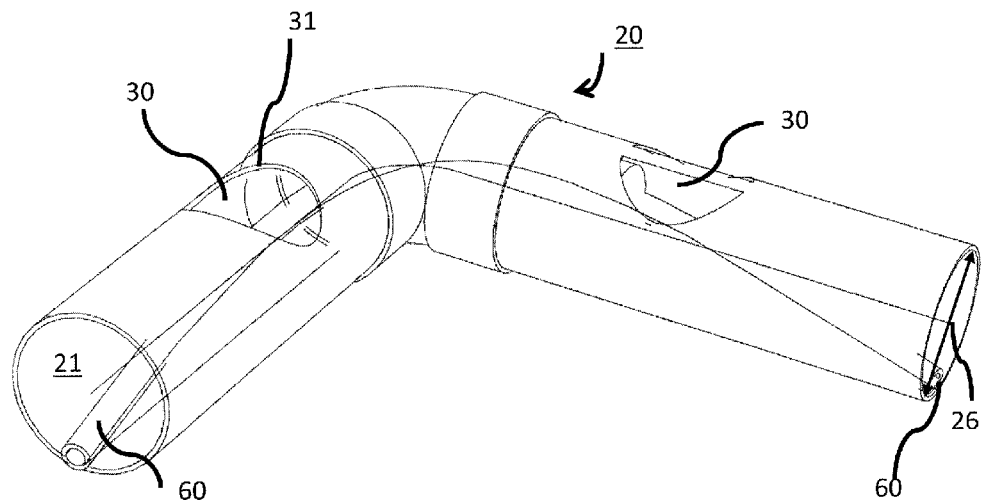
FIG. 5
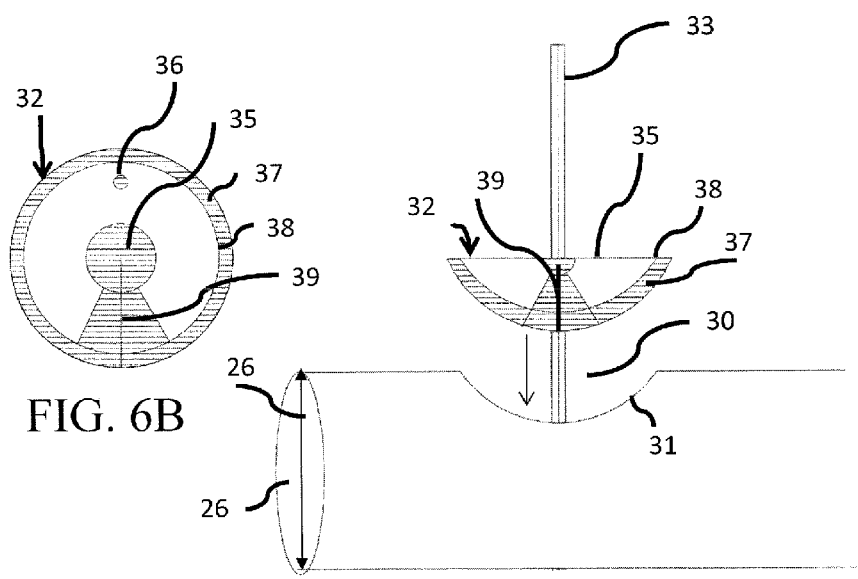
FIG. 6B
FIG. 6A

SELF-WATERING, MOBILE, CONTAINER GARDENING SYSTEM

BACKGROUND OF INVENTION

Consumers today have many concerns about the environmental issues surrounding agricultural practices utilized to provide food. Many consumers would like to consume food, particularly produce, grown without the use of excessive or chemical pesticides and fertilizers. There is also a very negative opinion on the part of many consumers about the use of genetically modified plants, water usage, and run-off issues inherent to large scale farming processes. In addition, the pollution and transport costs have all become relevant factors to consumer decisions regarding food products.

In response to those concerns, many consumers grow and maintain local, personal gardens. There are a variety of systems that have also been developed that allow consumers to grow gardens in smaller spaces. Many of these systems are based on hydroponics, which necessitate water access, and often electrical access to power circulation pumps for the systems. Some systems utilize soil-filled tubular containers with pump systems for delivering water along the length of the container. But, again, this necessitates electrical access to power pumps.

Another issue that many consumers face, particularly city-dwelling or urban-dwelling consumers, is the change in light patterns over the course of a year. Surrounding structures often result in shaded areas that are not conducive to plant growth. Most container garden systems are stationary due to size, weight, design or, more often, water or electrical requirements. Therefore, the growing season can be shortened or only plants with relatively short diurnal growth periods can be maintained.

Space constraints are probably the most relevant issue for city or urban gardeners. Even for unattached dwellings, the space necessary for growing most types of vegetables is not available or it can be unattractive to use available space for vegetable gardening or for installation of large container systems for vegetable gardening. Further, it may not be practical or desirable to dedicate space to most gardening techniques, which may only be productive for a limited amount of time. Hydroponics and container systems are not usually easy to move around and it is not usually practical to assemble and disassemble such systems on a regular basis. Thus, even when not in use, such systems must often remain in place, in anticipation of when they can be productively used again. Furthermore, the used water and/or depleted soil in such systems need to be purged and replaced periodically for maximum product yield. It can be impractical, unsightly, or even illegal to flush or purge such systems directly onto the ground or into a sewer or drainage system. Thus, these entire systems would have to be disassembled and moved periodically to a different location for such purging.

Despite advances in hydroponics and container-growing gardening methods, the above-described issues continue to be problematic for most home gardeners. There is still a need for a gardening system that can produce sufficient amounts of food product, but which does not require a large amount of space, can be used for a greater amount of time during the year, and, if necessary, can be disassembled or otherwise reduced in size for moving or transport. It would be particularly advantageous if such devices could be used by small scale home gardeners, as well as larger scale community farming or small farm operations. An even further advantage would be for such systems to utilize less water, fertilizers, or pesticides than most systems or even in-ground gardening methods.

BRIEF SUMMARY

In accordance with the invention, the difficulties of gardening in urban or city environments with limited space and restricted sunlight is solved by a portable, vertically expandable, self-contained gardening system. The container gardening system can operate without attachment to a water source or electrical outlet. The portability of the device allows it to be moved to take maximum advantage of available sunlight as it moves throughout the growing season. The ability of the system to be disassembled or collapsed allows it to be reduced in size and shape for easy storage or transport. Because the system provides everything necessary to grow plants, one or more of the systems can be placed in areas where plants could typically not be grown, such as rooftops, alley ways, vacant lots, driveways, etc. Smaller versions can be used on porches, small yards, driveways, boats, and even indoors.

The system of the subject invention can realize a variety of shapes and sizes, a 3-dimensional vertically expandable configuration can provide a maximized amount of growing space. The system of the subject invention is advantageously designed to be collapsible without complete disassembly of the components, though disassembly is optional. A further advantage of certain designs of the subject invention is the ability of the multiple levels of the three-dimensional structure to collapse concentrically, forming a nested configuration, further reducing the size of the system and increasing the ease of portability.

Embodiments of the subject invention utilize a system of interconnecting tubes filled with soil or other growing medium. The tubes can have multiple plant ports or openings at pre-determined appropriate intervals into which, or from which, one or more plants can emerge from the tubes' interiors. A port can further be substantially sealed or closed around a plant stem with the use of a port cover that fits into the plant port, surrounding the plant stem. The port cover can inhibit unwanted ingress of undesirables into the growth medium. It can be particularly important to inhibit rain from entering the system, to prevent overwatering or flooding of the tubes.

The vertical tubular structure can be supported by two or more stepped supports on which successive levels of the 3-dimensional structure can rest on successively higher levels of the support. The distance or "rise" between each stair can dictate the height of the system. Further, the stepped supports can be arranged with offset riser levels, such that when placed around the periphery of the tubular structure, each level of the structure can be slightly angled downward. This can provide the structure with a generally spiral-like configuration and can aid in drainage and dispersal of substances, such as water and beneficial materials, in the system. The bottom end of the spiral can be closed to inhibit loss of growth medium or other substances and to prevent ingress of undesirables.

One of the unique advantages of the embodiments of the subject invention is the ability to move the entire system. The system can be moved daily, seasonally, or at any other time as needed. In one example, a system of the subject invention can be moved to follow the sunlight as it moves across a given area. The system can also be moved out of the way for convenience or storage. This can be accomplished by installing one or more wheels on the system or on a support for the system. In a particular embodiment, wheels are attached to the lower ends of two or more of the stair supports. As mentioned above, the levels of the system can be angled to provide a spiral-like configuration. In one embodiment, the stair supports themselves can be configured with variable stair levels. However, in another embodiment, the stair supports are identical and the wheels can be attached to various length spacers that, when operably connected to the stepped supports provide the downward angle or spiral configuration to the levels.

After the port covers are in place within the plant ports, the system will be substantially closed, though not entirely sealed, and substantially protected from outside elements. This can include exclusion of most rain water or other moisture. Thus, to provide water and other nutrients to the plants in the system, an irrigation tube or hose can traverse through all or most of the interior length of the tubular structure. The lower end of the irrigation tube can be closable and the upper end can be connected to a reservoir at the upper end of the system, into which water can be manually or, if desired, automatically hose or rain filled. The amount of water directed into the irrigation tube can be controllable or regulated, to prevent flooding the system. This method also inhibits compaction of the soil or growth medium, since water or other liquids are not introduced from the top level of the soil.

The container garden system of the subject invention provides a solution for many of the problems that prevent consumers from growing their own food. It also lends itself to a unique business method of providing, for a fee, a temporary, portable, easy-to-maintain gardening system that can be delivered to consumers for use during a particular time period or growing season. Once the season or period is over, the systems can be easily collapsed, picked up, transported to another location and/or purged for the next season or customer. This prevents the customer from having to store the structure or deal with the problem of purging the growing medium.

Finally, the embodiments of the system have the additional advantage of being easy to manage and amenable to simple pest management techniques. The self-contained, space-saving design of the system allows for manual control of pests or at least reduced pesticide use. The system can also be easily covered with a mesh or net to inhibit activities of insects, birds, or other animals.

This Brief Summary is provided to generally introduce the reader to one or more select concepts described below in the Detailed Disclosure in a simplified form. This Summary is not intended to identify key and/or required features of the claimed subject matter. Other aspects and further scope of applicability of the present invention will also become apparent from the detailed descriptions given herein. It should be understood, however, that the detailed descriptions, while indicating preferred embodiments of the invention, are given by way of illustration only, since various changes and modifications within the spirit and scope of the invention will become apparent from such descriptions. The invention is defined by the claims below.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any inference or reference to dimensions in the drawings or the following description is specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which:

FIG. 5 illustrates a section of the tubular system and shows how an irrigation tube can traverse some length tubular system.

FIGS. 6A and 6B illustrate an embodiment of a port cover (6A) and how it can fit into a port within a tube (6B). Also shown is a plant stake within a port cover.

DETAILED DISCLOSURE

Figure 1:
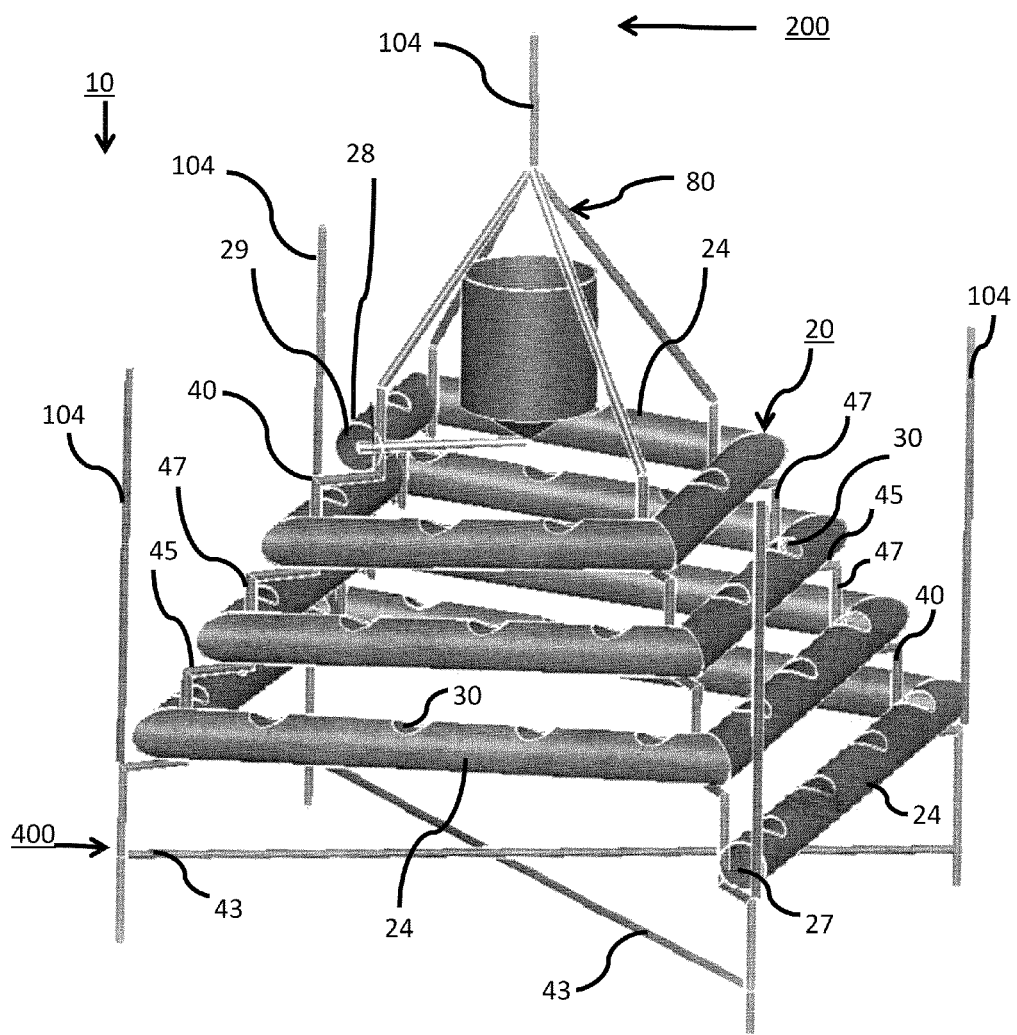
FIG. 1 illustrates one embodiment of an assembled container system of the subject invention. This view includes an embodiment of a protective cover support system.

The subject invention pertains to embodiments of a container gardening system with features that allow environmental control of the growing conditions. More specifically, the subject invention provides one or more embodiments of a system of interconnected tubes, or similar devices, capable of containing soil or other solid growing medium. The tubular system can be arranged in a 3-dimensional vertical shape that provides a confined, but effective growing area.

The following description will disclose that the subject invention is particularly useful in the area of home gardening, in particular home gardening in urban areas. A method for providing the gardening systems as a fee-based business will also be disclosed. However, a person with skill in the art will be able to recognize numerous other uses that would be applicable to the devices and methods of the subject invention. While the subject application describes, and many of the terms herein relate to, a use for home gardening, other modifications or uses will become apparent to a person with skill in the art and having benefit of the subject disclosure. Such alternatives are contemplated to be within the scope of the present invention.

In the description that follows, a number of terms related to the growing of plants in container gardens are used. In order to provide a clear and consistent understanding of the specification and claims, including the scope to be given such terms, the following definitions are provided.

The term "plant" as used herein includes any type of non-locomotor organism, typically having a cellulose-based structure and a capacity for indefinite growth. This can include, but is not limited to, vegetables, ornamentals, herbs, fungi, brackens, grasses, and other soil-dwelling or soil-utilizing organisms. Typically, it refers to sexually reproducing, e.g., seed or spore producing, organisms. But, it can include asexually reproducing, e.g., tuber or runner producing, organisms.

The term "soil" is also used herein merely for literary convenience. One advantage of the embodiments of the subject invention is the ability to fill all or part of the tubular structure with any of a variety of growing media, which can include, but is not limited to, soil, dirt, organic matter, absorbent polymers, non-organic materials, and any of a variety of other substances or materials in which plants can grow. Thus, the devices, apparatuses, methods, techniques, and/or procedures of the subject invention are not limited to use with just one or a few types of plant growing media and could be utilized with multiple substances.

The term "undesirables" as used herein refers to any organism or substances that would be considered detrimental, damaging, unnecessary, or a contaminant to plants growing in the container system of the subject invention. This can include, but is not limited to, unregulated rain or other uncontrolled water, seeds, spores or other reproductive or regenerative plant parts, insects, animals, diseases, pesticides, or fertilizers that may be airborne or otherwise capable of gaining access to the soil or to the plants.

Also, as used herein, and unless otherwise specifically stated, the terms "operatively attached," "operable connection," "operably connected," and grammatical variations thereof mean that the particular elements are connected in such a way that they cooperate to achieve their intended function or functions. The "connection" or "engagement" may be direct, or indirect, physical or remote.

Finally, reference is made throughout the application to the "proximal end" and "distal end" of various components of the subject invention. As used herein, the proximal end is that end nearest to the ground or supporting surface. Conversely, the distal end is that end, which, when the device is assembled for use, is at the highest point from the ground or supporting surface.

The present invention is more particularly described in the following examples that are intended to be illustrative only since numerous modifications and variations therein will be apparent to those skilled in the art. As used in the specification and in the claims, the singular for "a," "an," and "the" includes plural referents unless the context clearly dictates otherwise.

Reference will be made to the attached figures on which the same reference numerals are used throughout to indicate the same or similar components. With reference to the attached figures, which show certain embodiments of the subject invention, it can be seen that the self-contained container gardening system 10 of the subject invention comprises a self-contained tubular structure 20 with multiple, interconnected levels 22 that can be raised vertically, usually from the center, to form a 3-dimentional shape. To support the levels of the tubular structure one or more stringer supports 40 can be positioned around the tubular structure with each level supported by individual horizontal 45 of the support. Within the tubular structure there can be an irrigation tube 60, which is attached to a reservoir tank 70 at the distal end 200 of the vertical structure. The reservoir tank can be used to store and supply substances for plant growth. Water, nutrients, and other materials or substances can be supplied to the irrigation tube to support plants growing from ports 30 in the tubular structure. Further embodiments can include port covers 32 that reduce access to the tube interiors and one or more transport mechanisms 50 at or about the proximal end 400 that can aid in relocating the system.

Figure 2:
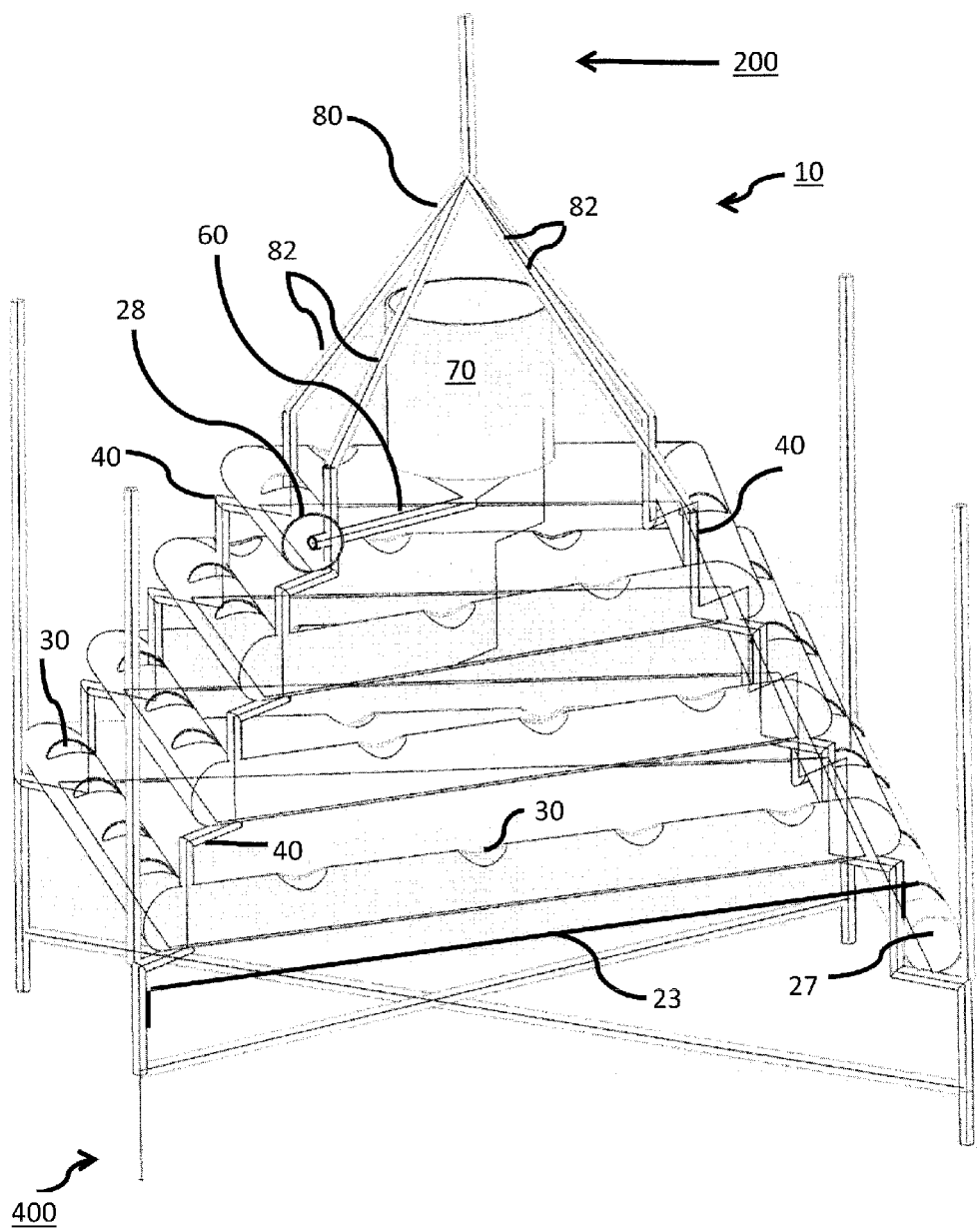
FIG. 2 illustrates another view of one embodiment of an assembled container system of the subject invention. This view also includes an embodiment of a protective cover support system.
Figure 3:
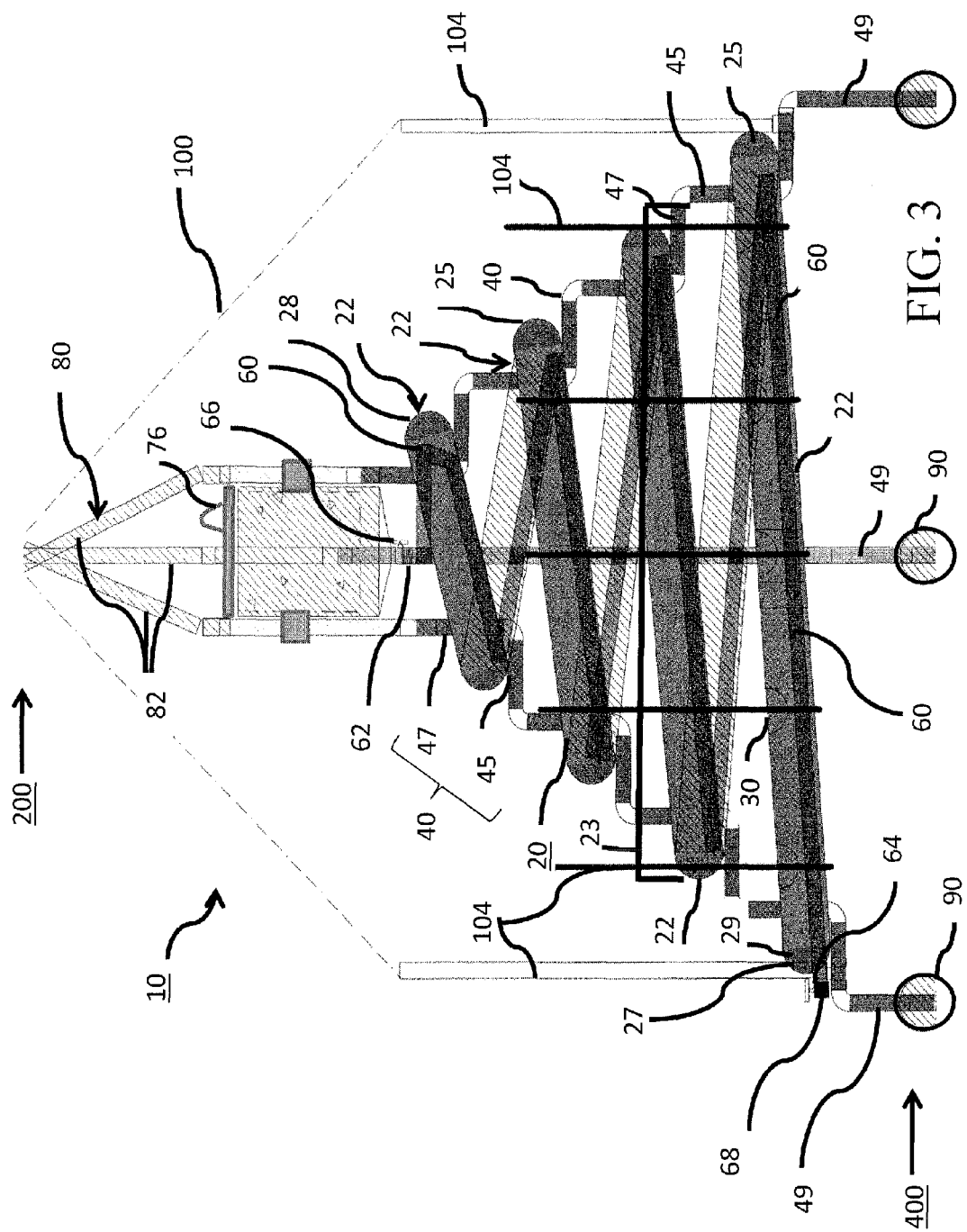
FIG. 3 illustrates an embodiment of an assembled container system of the subject invention that includes wheel supports that raise the stringer supports to provide a spiral configuration. Also shown is an example of a protective cover supported by uprights.

Regarding the tubular structure 20, FIGS. 1, 2, and 3 show embodiments wherein a tubular structure forms multiple, interconnected, vertical levels 22 of continuous tubing. Each distal 200 level can have successively smaller diameters 23 than the previous proximal 400 level. Thus, as the tubular structure ascends, the diameter 23 of the distal 200 levels 22 can decrease. Alternatively, the levels can have a consistent diameter 23 as they ascend, such that the distal levels 200 are substantially parallel to or overlapping with the successive proximal levels. In other words, the three-dimensional structure of the tubular structure can vary, depending upon the arrangement and size of the individual tubular levels, length of the tubing sections, level diameter 23, tubing diameter 26, and other factors understood by those with skill in the art. Thus, for example, the tubular structure can be pyramidal or conical, where the diameter of the distal levels is in some way smaller than that of the proximal levels.

In a further embodiment, the levels can be different shapes. For example, one or more of the proximal 400 levels 22 can be square or rectangular and one or more of the distal levels can be circular or oval. Thus, the tubular shape can change or be different as it ascends. Therefore, it will be understood that the three-dimensional structure of the tubular structure can vary and is not limited to the shapes mentioned herein or shown in the attached figures. Such variations are within the scope of this invention.

Further, the tubular structure can be formed as a single unit, such as, for example, by extrusion techniques or permanently connected sections, or other techniques or devices, that allow the tubular structure to perform as described. Alternatively, the tubular structure can comprise multiple pieces that are joined to form the tubular structure. In one embodiment, the tubular structure 20 is formed of multiple sections 24 comprising a rigid material that can maintain the shape of an interior space 21 or interior diameter 26. Ideally, the rigid material can be lightweight and have sections that are amenable to interconnection. Further, the rigid material can be sufficiently robust or sturdy that it can withstand the processes of being filled with soil, being moved, and having the levels raised or lowered without damage to the levels 22 or sections. Such material can be selected from one or more, but is not limited to, plastic, polyvinyl chloride (PVC), nylon, rubber, metal, ceramics, clay, wood or wood products, silicon, glass, other suitable materials or combinations thereof. It can be preferable for the selected material to be suitable for plant growth and not leach or otherwise introduce dangerous or undesirable toxins or chemicals into the soil therein. In particular, undesirable toxins or chemicals that could be absorbed into the plant tissues are to be avoided in the materials of the tubing sections.

In a specific embodiment, the tubular structure comprises tubular sections 24 of PVC material. In a more specific embodiment, the tubular structure 20 comprises multiple linear sections 24 of tubular PVC that are connected at their ends by compatible hubs and/or connectors 25, such as, for example, elbow connectors. The diameter 26 of the PVC tubing, which is typically measured between the outer surfaces can vary, as discussed above. In a particular embodiment, the tube diameter 26 is between approximately 1" and approximately 6". In a more particular embodiment, one or more of the proximal 400 levels 22 has tubing sections with a diameter 26 of between approximately 4" and approximately 6". As the levels ascend, one or more of the distal levels can have tubing sections 22 with a diameter 26 of between approximately 1" and approximately 4". This can allow the tubing sections to have either a gradual or a more abrupt change in diameter as the levels ascend. Thus, a tubular structure could have differing diameters as the tubular structure ascends or even as it descends. It is well-known in the art to use reducing connectors or reducing elbows that allow different diameters of tubing to be joined together. In a further embodiment, the proximal terminal end 27 and the distal terminal end 28 can be closed, sealed, or capped to prevent loss of soil, water, or other materials and prevent ingress of undesirable materials or organisms. The use of a removable cap 29 to close the ends of PVC tubing is known in the art and could be used with the embodiments of the subject invention. It is also well-known in the art to form a permanent seal or to cover tubing ends with material that is sealed around the tubing. Such variations, which perform the same function, in substantially the same way, with substantially the same result are within the scope of this invention. Further, as will be discussed below, the caps can have openings there through to accommodate the ends of an irrigation tube 60 and/or one or more valves.

Figure 4:
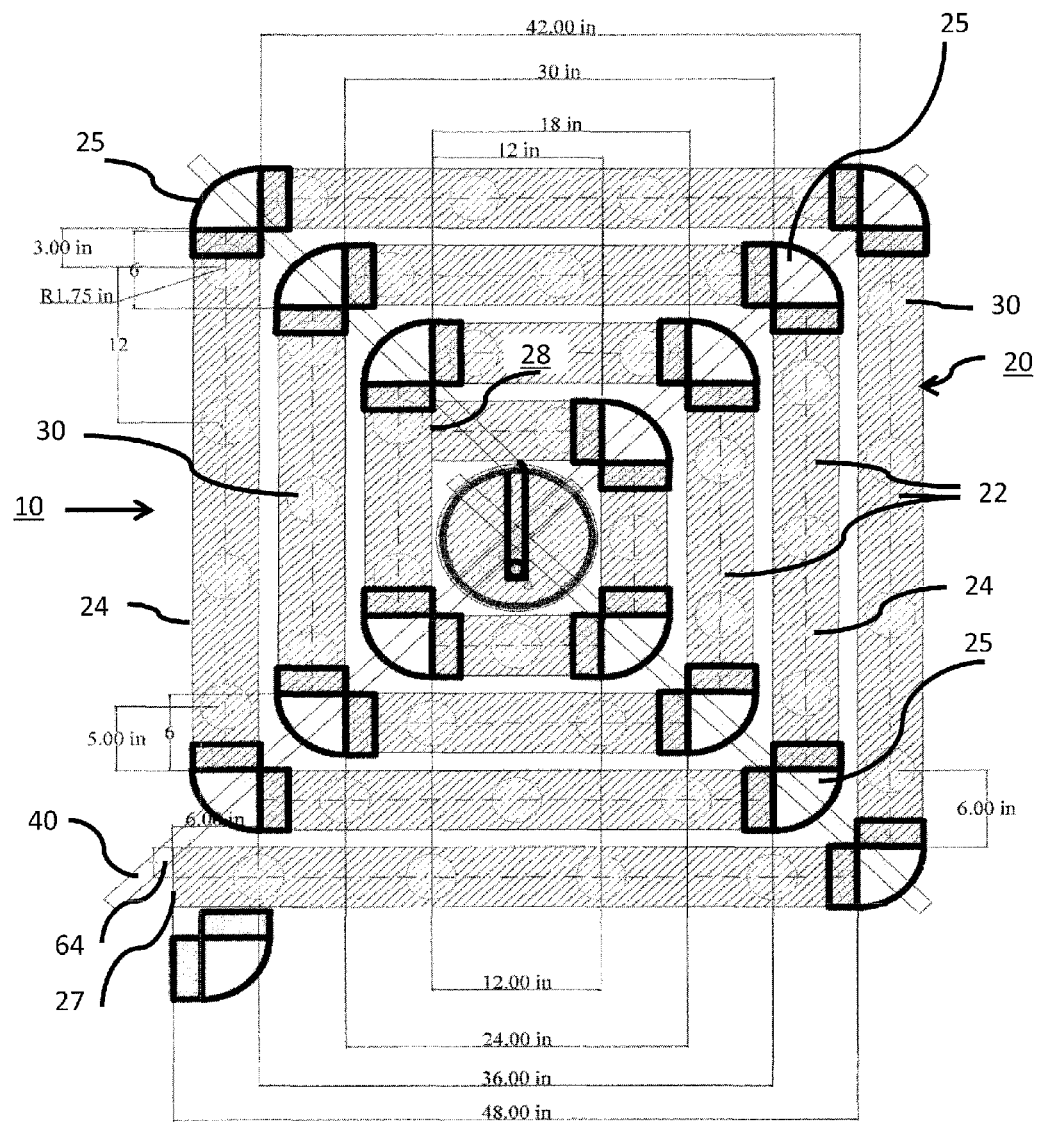
FIG. 4 is top plan view of an embodiment of an assembled container system. This view demonstrates how the layers of tubular sections can be concentrically nested when the supports are removed.

For purposes of collapsibility and transport, the tubular structure can have a consistent inner space 21 diameter, and the length of the linear tubing sections can be adjusted or shortened to provide a pyramidal structure. FIG. 4 illustrates a specific example of this embodiment, wherein the lengths of the PVC tubing sections 22 range from approximately 48" in length for the proximal levels and are successively shortened to approximately 36" in length, approximately 24" in length, and approximately 12" in length of successively distal levels. The sections can further be joined by 90° elbow sections, or similar devices that will form a continuous tubular length. As seen in FIG. 4, the levels of tubing sections can be collapsed or nested within each other to form a generally squared, flat spiral configuration. When the levels are successively raised, they form a generally pyramidal shape, such as shown, for example, in FIGS. 1-3. Such a configuration can make assembly quick and easy. It can also allow multiple tubing structures to be placed side-by-side and/or stacked for transport.

The container gardening system of the subject invention can be provided initially as an entirely disassembled structure. Thus, for purposes of packaging, storage, and/or transport, it can be beneficial if the disassembled structure occupies minimal space. In one embodiment, the tubing sections have successively smaller diameters, allowing them to be collinear or inserted within one another. Appropriately sized connectors 25 can be used to join the sections and form the desired three-dimensional structure. This embodiment can also allow the fully assembled tubular structure to be subsequently collapsed into a flat spiral shape for transport, as described above.

When the tubular structure comprises multiple sections that are joined to form a continuous length of tubing, the attachment of the sections, which can include any elbow, bend, or similar devices used to join sections of tubing, can be joined in such a fashion that the tubing levels can be moved without damaging the tubing connections. In one embodiment, the tubing sections or joined by continuous threading, which is not shown, but is well-known in the art, that allows the tubing sections to rotate or turn as the levels are raised or lowered. Alternatively, the sections are joined by one or more clips 18 that can couple with openings, depressions, or other clip securing structures 19 on a tubing piece. Ideally, the method of connection allows a tubing section to rotate relative to the connector, so that the sections can be raised or lowered without separating.

The assembled tubing system will be filled with soil. This can be accomplished either section by section, as the system is constructed, or the system can be filled after assembly. To facilitate filling after assembly and to accommodate the growing of plants therein, the tubing can have at least one and, preferably, multiple ports 30 within the tubing. A port can provide access from the outside of the tubing section to the interior space 21. A port can be of any diameter and can depend upon a variety of factors, such as, for example, the tubing diameter 26, the tubing level 22, the tubing material, the type of plants to be grown, the amount or depth of the soil within a tubing section, and other factors that are understood by those with skill in the art. A port can be located anywhere around the diameter of a tubing section. Further, a tubing section can have one or more ports therein.

Figure 7:
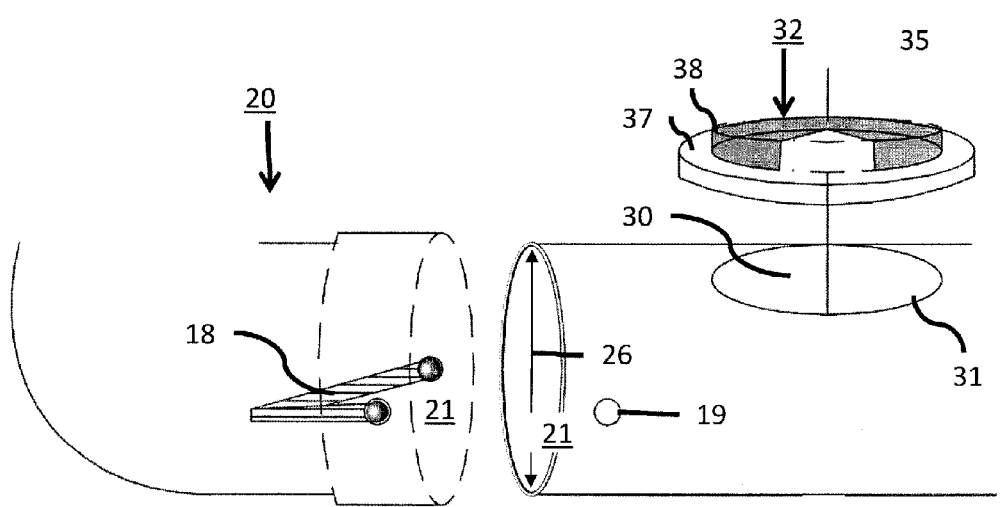
FIG. 7 illustrates one embodiment of a device and method for rotatably joining corners pipe sections with linear pipe sections. The rotatably joined pipe sections allow the system to be collapsed flat when the supports are removed.

In one embodiment, when a tubing system is assembled, the one or more ports are located at, or about, the distal sides 200 of the tubing, as shown, for example, in FIGS. 2 and 5. This can help maintain the soil in the tubing and facilitate vertical growth of plants. In a further embodiment, the ports are formed in the tubing at intervals that provide each plant growing within a port to have access to approximately one cubic foot of interior space 21 and soil. Thus, distal tubing levels 22 can have fewer ports than proximal tubing levels. Some plants may require less space or soil for adequate growth and in such instances the ports can be located closer together. A typical port can have a circular circumferential shape, an example of which is shown in FIGS. 4, 5, and 7. It will be understood, however, that a port can have any desirable circumferential shape, including, but not limited to, oval, square, rectangular, triangular, or any other polygonal shape.

The diameter of a port can also vary and will depend upon a variety of factors, such as those mentioned above. It is anticipated that rooted plants will be placed within the ports. However, this does not preclude the possibility of seeds, spores, root tubers, or the like from being placed within the soil exposed by a port. In this instance, the ports can remain exposed until such time as the plant is sufficiently grown to accommodate the use of a port cover 32.

A port cover can be used to close the open port area around a plant stem. The use of a port cover can inhibit excess water from entering the tubing system. Port covers can also inhibit infestation of the soil by deleterious insects, fungi, weeds, disease, or other undesirables. This can reduce the need to use pesticides, fungicides, or herbicides in the system.

In one embodiment, a port cover comprises a support piece 34 of a rigid or semi-rigid material. The support piece can, but is not required to, conform to the circumferential shape of the port. In one embodiment, the support piece has a shape and dimensions that allow it to fit closely within a port. In a further embodiment, the support piece can have a stem slot 35, which is a cut-out or open space from the peripheral edge 38 of the support piece to at or about the center of the support piece. When the support piece is positioned within a port, the stem slot can go fully or at least partially around the plant stem, allowing the support piece to be placed fully within the port.

To further inhibit undesirables from accessing a tube interior 21, the support piece can be surrounded with a gasket 37 that can form a seal or at least another barrier between the port and the support piece. In one embodiment, the support piece 34 is substantially surrounded with the gasket, of which an example is shown in FIGS. 6A, 6B and 7. In this embodiment, the dimensions of the gasket are greater than those of the support piece, causing it to extend beyond the peripheral edge of the support piece. In a still further embodiment, the gasket covers or at least partially encroaches into the stem slot and has a slit 39 therein to accommodate insertion of a plant stem into the stem slot. The gasket can close off or seal any desired amount of space between a support piece 34 and the peripheral edge 31 of a port. In a specific embodiment, the gasket is affixed to or otherwise protrudes from or about the proximal side 400 of a support piece, which is illustrated, for example, in FIG. 7. The gasket could also be affixed to the peripheral edge of a support piece by any of a variety of methods or devices known to those with skill in the art. Still further, the support piece can be formed of a material that is thinner and more flexible near the peripheral edge, providing an equivalent structure and function as a gasket attached thereto. The point being that some portion of the outside edge of a port cover is flexible. When the support piece is positioned within a port, the gasket can be pushed into the port as the support piece is fitted into the port. In this way, a port cover can be seated into a port with the peripheral edge of the port 31 adjacent to the peripheral edge 38 of the support piece. Alternatively, the gasket can be sized to fit within the port and be situated adjacent to the peripheral edge of the port. Further, the gasket 37 can fill or cover any amount of space between the support piece and the port. Further, the gasket within the stem slot can abut or be in close proximity to the plant stem, to further cover any open space, without inhibiting growth of the plant and providing further protection against undesirables reaching the soil.

A gasket can comprise any of a variety of materials capable of forming a seal or at least a barrier between the support piece and a port. The rigidity of a gasket will depend upon the material utilized, the size of the port into which it will fit, whether the gasket will be fit into the port or be inserted past the port and into the tube to cover exposed soil around the support piece and port, and other factors understood by a skilled artisan. In a specific embodiment, a gasket comprises a rigid, closed-cell foam that fits into the port adjacent the peripheral edge. In an alternative specific embodiment, a gasket comprises a flexible, closed-cell foam that is pushed past the port and into the tube to surround the area between the port and the support piece.

It is well-known that some plants require or benefit from the assistance of additional support while growing. Tomatoes, for example, are often attached to and supported by stakes or rods placed in the ground or attached to the growing container and near the main stem. Plants grown in the container system of the subject invention may also require or benefit from additional support.

In one embodiment, a port cover 32 has at least one stake hole 36 in the port cover through which a plant stake 33 can be pushed into the soil. The stake hole can also provide additional support to a plant stake, since the depth of the soil in the tubing section 24 may not provide sufficient support. It can be desirable for the diameter of the plant stake to be sized that it can tightly engage with the stake hole, so that the stake hole can support the plant stake and so that there is less opportunity for ingress of undesirables between the stake hole and the plant stake. In a further embodiment, the stake hole can be covered by the gasket and a stake inserted therein can separate, puncture, or otherwise move the gasket aside to reach the soil.

As described above, the tubing levels can be positioned at different heights. The use of successively higher vertical levels can permit more plants to be grown in a given space. With some embodiments, it is possible to grow at least three times as many plants within a container garden system of the subject invention as could be grown in the same area occupied by the system. The vertical tubing system also allows easier access to the plants, making gardening less strenuous and less time-consuming. The height of the levels can vary and will preferably be such that each plant in the system is provided with sufficient light, so that neighboring plants do not excessively shade or block light to plants in lower levels. Ports can also be staggered between levels to prevent plant overlap.

In one embodiment, a tubing structure 20 of the subject invention is supported by one or more stringer supports 40. A stringer support can be similar to a stair stringer in that it comprises successively stepped horizontal levels 45 on which tubing levels 22 can be placed and supported much like stair treads. The horizontal levels are connected by risers 47 that can dictate the overall achievable height of a tubing structure. FIGS. 1, 2, and 3 illustrate a tubing structure where successive tubing levels 22 are supported on successively higher and successively stepped horizontal levels. In this way, the inner tubing levels 22 can be higher, or more distal 200, than the lower, or more proximal 400, tubing levels, providing a conical or pyramidal 3-dimensionally shaped tubing structure. In a particular embodiment, the distal ends 200 of the stringer supports terminate in risers that extend above the tubing distal terminal end 28. It can be preferable, but is not required that the risers extend to the same height above the tubing distal terminal end.

In one embodiment, a stringer support 40 has horizontal levels 45 that are the same width and are connected by risers 47 that are, likewise, all the same height. FIG. 1 shows an example of this embodiment, where tubing levels placed on successive horizontal levels can be substantially consistently spaced vertically, particularly when the tubing sections are all the same diameter 26. In an alternative embodiment, a stringer support has horizontal levels of varying width. In a still further alternative embodiment, a stringer support has risers of varying height. This allows the risers to support tubing levels at different heights and the horizontal levels to accommodate tubing sections of different diameters.

As will be discussed further below, water and other materials can be introduced into the tubing system through an irrigation tube or hose 60 and reservoir system. The use of stringer supports of successive riser heights can provide the subject invention with the advantageous ability to disperse water and materials without the aid of pumps or other electromechanical assistance. Instead, the embodiments of the subject invention can employ gravity to disperse water and materials through an irrigation tube.

Figure 8:
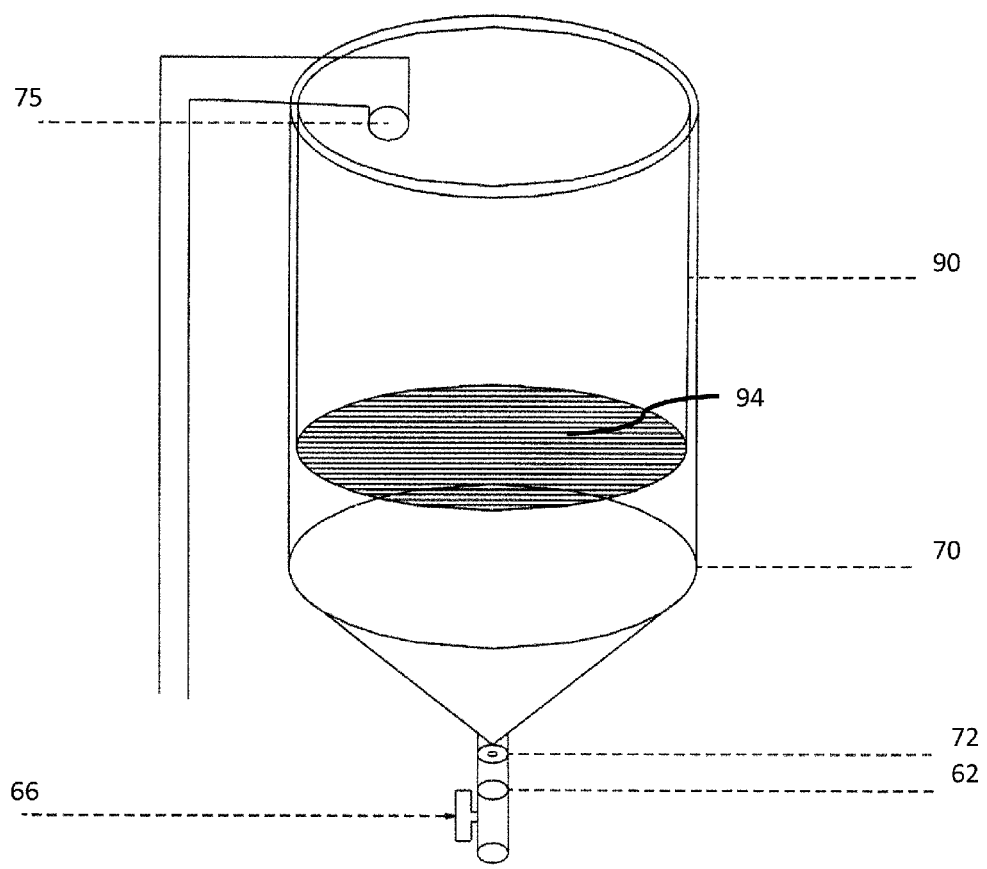
FIG. 8 illustrates one embodiment of a reservoir that can be positioned above the vertically assembled tubular system and attached to an irrigation tube, such as, for example, a porous hose, traversing some length of the tubes. This embodiment shows a secondary nutrient reservoir inserted into the main reservoir.
Figure 9:
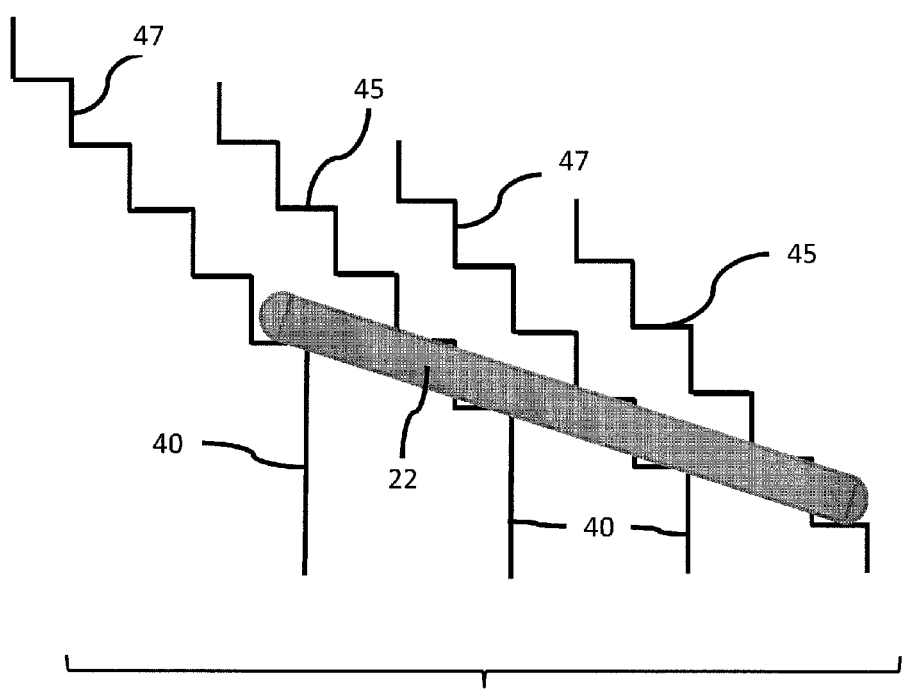
FIG. 9 illustrates an example of a set of stringer supports with graduated horizontal levels that can create a spiraled tubular system.

In a particular embodiment, a tubular structure 20 is supported by a series of two or more stringer supports with the risers on each stringer support graduated in height. Alternatively, the riser heights can be the same, but each one has a most proximal horizontal level that starts more distally than another support stringer in a series. When the risers are aligned around the tubular structure with the first horizontal levels progressing in a graduated fashion around the tubular structure, the tubular levels will tilt slightly, providing a spiral configuration to the contiguous tubular sections. FIG. 8 demonstrates one embodiment of series of support stringers where the most proximal horizontal level on each one starts slightly higher, or more distally, than the next one. When arranged consecutively around a tubular structure, ideally the proximal terminal end 27 of the tubing structure will be at the most proximal 400 point, or is supported by or in close proximity to the most proximally located horizontal level. FIGS. 1 and 3 provide examples of this embodiment and further illustrate the location of the proximal terminal end 27 if the tubing structure is tilted to the most proximal 400 position.

An alternative embodiment utilizes stringer supports that are identical in configuration, in that at least the height of the risers is the same on all of the stringer supports used to support a tubular structure. To achieve the desirable tilting of the tubing levels, spacers 49 can be operably connected to the proximal ends of the stringer supports. The spacers can be of graduated length such that, when operably connected in order of increasing height starting from the proximal terminal end 27, the tubing structure will attain a spiral configuration, again, with the proximal terminal end at the most proximal position. FIG. 3 demonstrates an example of an embodiment where spacers 49 of different heights are operably connected to the proximal ends 400 of the stringer supports. It can be seen in this figure that the variable heights of the spacers cause the tubular structure to tilt, giving an overall spiral configuration to the tubular structure.

The weight of the tubing structure, particularly when filled with soil, can be sufficient to ensure the stability of the entire system. However, if the system is to be moved, it can be beneficial to have the tubing structure somehow secured to the stringer supports. In one embodiment, the tubing structure is removably attached to the stringer supports. Such attachment can be achieved by any of a multitude of methods and devices, including, but not limited to, adjustable bands, such as, for example, zip-ties around the tubing sections and the stringer supports, a plurality of nuts and bolts connecting the tubing sections to the stringer supports, a removable adhesive or silicone layer that can be pulled apart without damaging the tubing, and other methods known to those with skill in the art. Such variations which provide the same function, in substantially the same way, with substantially the same result are within the scope of this invention.

It would be understood by a person skilled in the art that the construction and materials utilized by stringer supports must be able to support the weight of a tubular structure containing soil and other components and materials as necessary and as will be described. In a particular embodiment, stringer supports are constructed from PVC pipe and connectors. However, they could also be constructed of any of a variety of other materials or by other methods and such variations are within the scope of this invention.

Another advantageous feature of the embodiments of the subject invention is the ability to move the entire container gardening system 10 from one place to another. This can be facilitated by any of a variety of transport mechanisms 50, but can be most beneficial when designed to require nothing more than manual power or the assistance of a small vehicle. In one embodiment, the stringer supports on which the tubular structure is supported have one or more transport mechanisms or structures operatively attached at or near their proximal ends that allow the entire system to be moved with minimal effort. By way of non-limiting example, one or more wheels, frictionless pads, tracks, rails, or other transport mechanisms can be operatively connected at or about the proximal ends of the stringer supports. If spacers are utilized, such motion-providing mechanisms can be operatively connected at or about their proximal ends before or after operable connection to the stringer supports.

Assembly of a container gardening system 10 of the subject invention can comprise lifting the tubing levels to the respective horizontal level on each stringer support. This can be accomplished by any convenient method, but is most easily accomplished when the stringer supports are stabilized. In one embodiment, a cross-piece 43 can be attached to two or more stringer supports to assist in holding them in a vertical position. FIGS. 1 and 2 illustrate an embodiment where in two opposing stringer supports are connected by a cross-piece 43.

The container gardening system of the subject invention is a stand-alone system that does not require attachment to any water or electrical source to operate. As detailed above, the features of the system also allow it to be substantially closed to outside elements or undesirables. Thus, any water, nutrients, or other substances that may be required in the system can be introduced by other methods or devices. If possible, such introduction should be regulated and maintain the self-contained nature of the system.

In one embodiment, an irrigation tube 60 is disposed within the tubular structure and extends along all or most of the length of the tubular structure, such that it is collinear with at least part of the tubular system. An irrigation tube can be any of a myriad of devices, including rigid pipes with multiple openings, porous hoses, often referred to in the art as "soaker hoses," flexible pipes with multiple openings, or other types of elongate flexible, semi-flexible, or non-flexible pipe-like structures through which water or other materials can be dispersed. To encourage proper root development in plants grown within the tubing and facilitate proper irrigation through the system, the irrigation tube can be positioned at or near the proximal side, or bottom, of the tubing system, such as shown, for example, in FIGS. 3 and 5. In an ideal embodiment, a soaker hose is employed along the entire length of the tubing structure and rests against or near the bottom side of the tubing.

A first end 62 of the irrigation tube can be located at or near the distal terminal end 28 of the tubular structure 20. A second end 64 of the irrigation tube 60 can be located at or near the proximal terminal end 27 of the tubular structure. Water, nutrients, and other materials can be introduced into the tubular structure at the distal terminal end of the irrigation tube and can flow or migrate to the proximal terminal end. While water and other substances could be introduced through the second end 64, the level to which they may rise in the irrigation tube will depend upon the amount of force with which they are introduced. Thus, while it can be advantageous to utilize the first end 62 and rely upon gravity to disperse materials through the system, it is possible that mechanical or electromechanical devices can also be used to introduce materials from either the first end or the second end of the irrigation tube.

In a further embodiment, a regulator valve 66 is attached to the distal terminal end and is used to control, in particular, the amount of water introduced into the system through the first end 62 of the irrigation tube. In a further embodiment, a release valve 68 is attached to the second end 64. If excess water is present in the irrigation tube, or if the irrigation tube needs to be purged, the release valve can be utilized. In an alternative embodiment, the regulator valve and release valve are reversed on the irrigation tube.

Using the irrigation tube, water and other materials can be introduced into the substantially closed container gardening system 10 of the subject invention. Typically, this can be accomplished by attaching a water source to the first end 62 and utilizing a regulator valve 66 to control the flow. In one embodiment, the water source is a water line or water hose attached to the first end. This can provide a consistent and unlimited water source. In an alternative embodiment, a reservoir tank 70 is operably connected to the first end 64. In a further embodiment, a drain 72 on the reservoir tank 70 is maintained in a position that facilitates water and other materials being gravity-fed into the irrigation tube. A reservoir can comprise any of a variety of materials capable of holding in and supporting a volume of water. In one embodiment, the reservoir is a flexible, bag-like device. In another embodiment, the reservoir is a rigid, walled container. It is within the skill of a person trained in the art to devise any of a variety of materials and designs for a reservoir tank. Such variations, which provide the same function, in substantially the same way, with substantially the same result, are within the scope of this invention.

A water source for filling a reservoir tank can be a variety of devices or techniques including, but not limited to, manual filling, hose or water line, rain, sprinkler system, or other sources, or some combination thereof. In a further embodiment, a filler pipe 75 can be attached to the container gardening system 10 that leads from about the proximal end to the distal end, where the distal end 200 leads into the reservoir tank. A water source, such as, for example, a hose, can be attached to the proximal end of the filler pipe to direct water up to the reservoir. This can eliminate having to raise a hose over the system and into the reservoir tank, potentially damaging plants or the system 10. Still further, a reservoir tank can have a cover or lid 76 that may need to be moved prior to filling the reservoir or which can have one or more openings to accommodate filling.

In keeping with the self-containment of the container garden system 10 of the subject invention, the reservoir tank can be configured as part of the structure of the system. In this way, the system is not dependent upon a plumbed water source and can be moved when the system is moved. In one embodiment, a suspension frame 80 is constructed at the distal end of the tubular system 20, an example of which, is shown in FIGS. 1, 2, and 3. A suspension frame can comprise one or more arms 82 to which a reservoir can be suspended to maintain the drain 72 in a position to gravity feed into the first end.

A suspension frame can be supported by or on any of the components of the system. In a particular embodiment, the arms of a suspension frame are operably connected to the stringer supports 40, at or about the distal ends 200. As discussed above, in one embodiment, the distal ends of the stringer supports can terminate in a riser 47 that extends above the distal terminal end 28 of the tubing structure 20, of which examples are shown in FIG. 8. In a specific embodiment, the proximal ends 400 of the arms 82 can be operably attached to the distal ends of risers and can extend above the tubular system 20. FIGS. 1 and 3 provide non-limiting examples of this embodiment.

The shape or configuration of the arms can depend upon how the reservoir tank will be supported. For example, the arms can extend distally and the reservoir tank can rest on the arms. Alternatively, the reservoir tank can be positioned adjacent to the arms and the arms can be attached to the sides or walls of the reservoir tank. This embodiment is shown by way of example in FIG. 3. In still another alternative, the reservoir tank can be suspended between the arms. In a specific embodiment, the support frame 80 can be disassembled from the stringer supports, such that when the tubular system is collapsed, the stringer supports, arms, and reservoir can be disassembled for packaging, storage, and/or transport. It will be appreciated by a skilled artisan that a reservoir tank can be supported on a container gardening system 10 of the subject invention by a myriad of techniques and devices. Thus, the invention is not to be considered limited to those embodiments disclosed herein and variations that provide the same function are within the scope of this invention.

In addition to water, it can be desirable to introduce other materials into the container gardening system. Materials can be introduced by removing the port covers and/or caps 29. Alternatively, a material can be introduced through the irrigation tube 60. One or more materials combined with the water in the reservoir tank can be directed into the irrigation tube with the water. The ability of the container gardening system to direct water and materials directly to the roots and soil around plants allows for the use of less material. Further, the ability of the reservoir to provide a constant water source to the irrigation tube by adjusting one or more valves can also provide a constant source of materials to the plants and soil. However, if the plants demonstrate signs of too much material being provided, it can be important that the material be removed from the irrigation tube as soon as possible.

In one embodiment, a nutrient reservoir 90 is a removably attachable container on the interior of the reservoir tank. The nutrient reservoir can be entirely porous or have at least a porous section 94, allowing water to leach or flow through some portion of the nutrient reservoir to dissolve or otherwise combine with material in the nutrient reservoir and flow or leach back out. Conversely, the nutrient reservoir can leach or release material into the water in the reservoir tank. In one embodiment, the proximal end 200 of the nutrient reservoir is porous, comprising, for example, mesh, screen, netting, or the like, or has multiple pores into which a solid or semi-solid material can be deposited. Water within the reservoir can flow in and around the material to leach out nutrients, minerals, and other substances that can be carried into the irrigation tube. FIG. 8 illustrates a non-limiting example of a reservoir tank 70 with an interior nutrient reservoir 90.

The container gardening system 10 is advantageously designed to provide a substantially closed system, which protects the soil therein from contamination and undesirables. Nonetheless, persistent organisms can find ingress. For example, certain insects or plants can climb the support stringers, which are in contact with the ground. This can allow them access around the ports and, in finding a flaw or opening in the port covers, can gain access to the system. In order to further inhibit the introduction of undesirable, usually motile, organisms into the tubular system, a deterrent or control mechanism or substance can be placed on, around, or in proximity to the proximal ends of the stringer supports 40 or spacers 49, or on any other part of the system that would be effective. In one embodiment, a repellent and/or pesticide is located at, around, or on the distal ends of the stringer supports or spacers. In an alternative embodiment, a sticky adhesive or tape is attached to the stringer supports or spacers to trap undesirables. In a particular embodiment, some part of the system, for example, the stringer supports and/or spacers can be at least partially coated with Polytetrafluoroethylene (PTFE), a synthetic fluoropolymer of tetrafluoroethylene commonly known as TEFLON®. PTFE has a low coefficient of friction which can inhibit crawling or climbing insects and plants from gaining purchase and, when strategically applied, can limit access by such organisms to the ports or other potentially unprotected openings.

However, the plant tissue growing from the ports 30 can still be vulnerable and can also present an entryway for undesirables to reach the soil and/or other plants within the system. One embodiment of the subject invention utilizes a protective cover 100 that can be draped over the system, or alternatively be form fitted, to further protect against airborne or flying insects, pests, birds, and other undesirables. A protective cover can comprise any flexible material, preferably one that does not inhibit growth of the plants if left in place for an extended period. It can also be beneficial to utilize a protective cover during inclement weather to protect plants and even extend the growing season. For example, a protective cover could be a flexible, clear plastic, that allows sunlight to penetrate, but keeps out undesirables and protects against frost or cold temperatures. By way of further example, a protective cover can be a mesh or net material that inhibits flying or airborne pests from gaining access to the plants. It is within the skill of an artisan to determine any of a multitude of materials that can be used for a protective cover. Such variations are within the scope of this invention.

In one embodiment, the protective cover is draped over the arms 82 of the suspension frame 80 and falls down over or is form fitted to cover the tubular system. FIG. 3 illustrates an example of this arrangement. In a further embodiment, one or more uprights 104 can be attached to the system to further support the protective cover and inhibit contact with the plants, particularly as they grow larger. FIGS. 1, 2, and 3 illustrate embodiments wherein multiple uprights 104 are installed on the system to hold the protective cover over the system, but away from contact with the plants. In a specific embodiment, an upright is connected to one or more arms of the suspension frame 80. In a further specific embodiment, shown, for example, in FIGS. 1, 2, and 3, the arms can cross or be bent in such a way that allows them to cross over the center of the system, forming a central point over which the protective cover 100 can be draped. In another specific embodiment, one or more uprights 104 can be attached to the stringer supports 40 to support the protective cover and hold it away from plants in the system. The uprights can extend substantially vertical, as shown in the examples in FIGS. 1, 2, and 3. Alternatively, the uprights can extend at any beneficial angle that would achieve the same result of supporting the protective cover and inhibiting contact with the plants.

The container gardening system of the subject invention can be particularly amenable to a business in which the systems can be provided individually or in multiple numbers to individuals or farms that wish to grow plants without standard gardening techniques. The advantages of the system of the subject invention allow it be easily delivered to a site, and, if necessary, more precisely located or moved as needed for particular situations. It can also require less space, provide more yield, and utilize less soil, chemicals, fertilizers, and effort. Areas that may not typically be associated with gardening or farming can become temporary or even long term crop producing areas. An ideal use would be on rooftops, parking lots, alleys, or other areas where immediate access to fresh produce, flowers, herbs, etc. can be advantageous. For example, restaurants can maintain one or more systems in close proximity to their buildings to provide fresh foods or herbs. Florists can maintain one or more systems to grow flowers or greenery.

In one embodiment, a customer can order one or more of the systems to be picked up or delivered to a specific location. The container systems can be prepared ahead of time with soil and, perhaps, even pre-ordered plantings. Upon delivery, the container system can be assembled and/or raised. As necessary, the system can moved to any desired location. When the crop is harvested or the plants are no longer otherwise productive, e.g., flowering season ends, the entire system can be disassembled and/or the tubular structure flattened for storage and/or pickup.

Once the system is retrieved, it can be relocated to a site where the soil within the tubular system can be purged and reused or treated in any manner necessary. Purging can comprise disassembling the system and releasing the soil from individual tubular sections, or water or other cleaning fluid can be forced through the system to wash it out. The tubular systems can then be refilled on an as-needed basis or can be filled ahead of time to allow the systems to acclimate, settle, or just in preparation for customer requests.

The following example illustrates procedures for practicing the subject invention. This example is provided for the purpose of illustration only and should not be construed as limiting. Thus, any and all variations that become evident as a result of the teachings herein or from the following example are contemplated to be within the scope of the present invention.

Example 1

Container Gardening System for Easy Assembly

The tubular system comprises lengths of PVC pipe that when constructed, form a spiral, pyramidal shaped tubular structure supported by four stringer supports. A soaker hose, such as those commonly utilized by gardeners, is entwined through the tubular system and is connected at the distal end to a reservoir tank suspended from a suspension frame attached to the stringer supports. Each stringer support rests on a wheel that allows the entire system to be moved easily by rolling. The wheels are attached to spacers of variable, graduated length that attach to the proximal ends of the stringer supports to provide the spiral shape to the tubular system. A nutrient reservoir is located in the reservoir tank to leach materials/substances into the water in the reservoir tank. A regulator valve between the soaker hose and the reservoir tank allows water to be introduced into the system in a controlled manner. A release valve at the opposite end of the soaker hose allows the hose to be purged if necessary, such as when too much water is released into the hose from the reservoir tank.

Ports are made into the distal sides of the tubular sections and port covers can be fit around the plants by the stem slot and then fit into the ports. A flexible foam material on the port covers can be inserted into the ports to cover the soil area exposed between the port and port cover. Likewise, the stem slot is covered with a foam material that goes around the plant stem and also protects the soil from exposure.

Lastly, a protective cover comprising a net or mesh material can be placed over the entire system and supported on uprights at the distal center and on the four most proximal corners of the stringer supports.

The container gardening system of the subject invention can provide an alternative method for gardening or farming. The system of the subject invention is quick and easy to construct and maintain and can be used for almost any type of garden plant that can thrive in about one square foot of soil. The self-contained, closed system allows for easy moving and transport, and reduces the amount of soil, fertilizer, pesticides, or other substances and materials that are typically used with in-ground gardening.

All patents, patent applications, provisional applications, and other publications referred to or cited herein are incorporated by reference in their entirety, including all figures and tables, to the extent they are not inconsistent with the explicit teachings of this specification. Additionally, the entire contents of the references cited within the references cited herein are also entirely incorporated by reference.

The examples and embodiments described herein are for illustrative purposes only and that various modifications or changes in light thereof will be suggested to persons skilled in the art and are to be included within the spirit and purview of this application.

Any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. Further, when a particular feature, structure, or characteristic is described in connection with any embodiment, it is within the purview of one skilled in the art to effect such feature, structure, or characteristic in connection with other ones of the embodiments.

The invention has been described herein in considerable detail, in order to comply with the Patent Statutes and to provide those skilled in the art with information needed to apply the novel principles, and to construct and use such specialized components as are required. However, the invention can be carried out by specifically different equipment and devices, and various modifications, both as to equipment details and operating procedures can be effected without departing from the scope of the invention itself. Further, although the present invention has been described with reference to specific details of certain embodiments thereof and by examples disclosed herein, it is not intended that such details should be regarded as limitations upon the scope of the invention except as and to the extent that they are included in the accompanying claims.

The invention claimed is:

1. A container gardening system comprising:
   a tubular system of concentric interconnected levels, Tillable with soil, having a distal end and a proximal end, where one or more of the levels can be raised to form a three-dimensional structure;
   one or more stringer supports having one or more stepped horizontal levels and at least one riser therebetween, where the one or more levels of the tubular system are supported on the one or more horizontal levels, respectively, to form the three-dimensional structure;
   a plurality of ports within the tubular system;
   a reservoir tank supported on the at least one stringer support; and
   an irrigation tube having a distal end, a proximal end, and extending collinear with at least part of the tubular system, where the distal end is operably connected to the reservoir tank such that a substance within the reservoir tank is directed by gravity into the irrigation tube.

2. A container gardening system according to claim 1, wherein the tubular system comprises tubing sections and connectors having a consistent diameter along the length of the tubular system.

3. A container gardening system according to claim 1, wherein the tubular system comprises tubing sections and connectors having differing diameters along the length of the tubular system.

4. A container gardening system according to claim 1, wherein the one or more horizontal levels vertically support the interconnected levels of the tubular structure in a spiral three-dimensional shape.

5. A container gardening system according to claim 4, wherein the one or more stringer supports have a proximal horizontal level that is successively more distal, such that when used consecutively to support a tubular structure form the spiral three-dimensional shape.

6. A container gardening system according to claim 4, further comprising one or more spacers of increasing length that when attached successively to the one or more stringer supports will form the tubular structure into the spiral three-dimensional shape.

7. A container gardening system according to claim 4, further comprising a transport mechanism attached to the stringer support.

8. A container gardening system according to claim 7, wherein the transport mechanism comprises a wheel.

9. A container gardening system according to claim 4, further comprising a port cover comprising:
   a support piece with a stem slot and a stake hole; and
   a gasket that surrounds the support piece and at least partially encroaches into the stem slot and the stake hole.

10. A container gardening system according to claim 9, further comprising a suspension frame attached to the distal ends of the one or more stringer supports, where the reservoir tank is supported by the suspension frame.

11. A container gardening system according to claim 10, wherein the suspension frame supports the reservoir tank over approximately the center of the tubular system.

12. A container gardening system according to claim 11, further comprising a regulator valve between the reservoir tank and the irrigation tube.

13. A container gardening system according to claim 10, further comprising a nutrient reservoir within the reservoir tank.

14. A container gardening system according to claim 10, further comprising a cap on each of the distal end and the proximal end of the tubular system.

15. A container gardening system according to claim 14, further comprising at least one of a regulator valve and a release valve.

16. A container gardening system according to claim 14, further comprising one or more uprights.

17. A container gardening system according to claim 16, further comprising a protective cover supported by the uprights.

18. A container gardening system according to claim 17, wherein at least one upright is attached to the suspension frame and extends distally to support the protective cover.

19. A container gardening system according to claim 14, wherein the tubing sections and connectors are joined so as to allow the levels of the tubular structure to be raised or lowered without disconnecting.

20. A container gardening system according to claim 10, further comprising a cross-piece connecting at least two stringer supports.

21. A method of temporarily providing a container gardening system to a customer, the container gardening system comprising:
   a tubular system of concentric interconnected levels having a distal end and a proximal end, where one or more of the levels can be raised to form a three-dimensional structure;
   one or more stringer supports having one or more stepped horizontal levels and at least one riser therebetween, where the one or more levels of the tubular system are supported on the one or more horizontal levels to form the three-dimensional structure;
   a plurality of ports within the tubular system;
   a reservoir tank supported on the at least one stringer support; and
   an irrigation tube having a distal end, a proximal end, and that is collinear with at least part of the tubular system, where the distal end is operably connected to the reservoir tank such that a substance within the reservoir tank is directed by gravity into the irrigation tube;
   wherein the method comprises:
   maintaining a plurality of container gardening systems at a storage location,
   receiving a request from a customer for at least one container gardening system,
   transporting a disassembled container gardening system to a location designated by the customer, assembling the container gardening system at the designated location, to form the three-dimensional structure, wherein after a pre-determined amount of time or receiving a request from the customer, disassembling the container gardening system, and transporting the container gardening system to the storage location.

22. The method, according to claim 21, further comprising filling the tubular system with soil.

23. The method according to claim 22, further comprising,
purging the tubular system of soil, and
refilling the tubular system.

* * * * *